(12) United States Patent
Levario (10) Patent No.: US 7,107,662 B1
(45) Date of Patent: Sep. 19, 2006

(54) METHOD AND A COUPLER FOR JOINING TWO STEEL PIPES

(75) Inventor: Alfredo Levario, Odessa, TX (US)

(73) Assignee: Gene W. Arant, as Trustee, Lincoln City, OR (US)

( * ) Notice: Subject to any disclaimer, the term of this patent is extended or adjusted under 35 U.S.C. 154(b) by 0 days.

(21) Appl. No.: 10/027,308

(22) Filed: Dec. 21, 2001

Related U.S. Application Data (60) Provisional application No. 60/257,415, filed on Dec. 21, 2000.

(51) Int. Cl.
*B23P 11/00* (2006.01)
*F16L 55/00* (2006.01)

(52) U.S. Cl. .......... 29/505; 29/450; 29/451; 285/55; 285/351; 285/363; 285/382.4; 277/608; 277/626

(58) Field of Classification Search .............. 29/450, 29/451, 505; 285/334.2, 351, 363, 382.4, 285/917, 55; 227/326, 620, 614, 626, 608
See application file for complete search history.

(56) References Cited

U.S. PATENT DOCUMENTS

| | | | | |
|---|---|---|---|---|
| 1,821,863 A | * | 9/1931 | Wilson | 285/334.2 |
| 2,699,344 A | * | 1/1955 | Bissell | 285/15 |
| 2,919,936 A | * | 1/1960 | Hurley | 285/55 |
| 3,047,937 A | * | 8/1962 | De Vecchi | 29/890.14 |
| 3,141,234 A | | 7/1964 | Geer, Jr. | |
| 3,228,096 A | * | 1/1966 | Albro | 29/890.15 |
| 3,253,841 A | * | 5/1966 | Ahmad | 285/55 |
| 3,507,506 A | * | 4/1970 | Tillman, III | 277/614 |
| 3,596,931 A | | 8/1971 | Mishler | 285/55 |
| 3,749,426 A | * | 7/1973 | Tillman, III | 285/336 |
| 3,877,730 A | * | 4/1975 | Frantz | 285/15 |
| 4,403,795 A | * | 9/1983 | Davlin | 285/184 |
| 4,470,609 A | * | 9/1984 | Poe | 285/334.2 |
| 4,474,381 A | * | 10/1984 | Wilkins et al. | 285/14 |
| 4,496,499 A | | 1/1985 | Brittain et al. | 264/36 |
| 4,563,025 A | * | 1/1986 | Poe | 285/334.2 |
| 4,691,740 A | | 9/1987 | Svetlik et al. | 138/109 |
| 4,852,655 A | | 8/1989 | Guy | 166/380 |
| 4,909,548 A | * | 3/1990 | Welkey | 285/334.2 |
| 4,913,464 A | * | 4/1990 | Taylor et al. | 285/15 |
| 4,997,613 A | | 3/1991 | McMillan | 264/229 |
| 5,103,915 A | * | 4/1992 | Sweeney et al. | 166/379 |
| 5,174,615 A | * | 12/1992 | Foster et al. | 285/334.2 |
| 5,180,193 A | * | 1/1993 | Rung et al. | 285/55 |
| 5,181,730 A | * | 1/1993 | Hjertholm | 285/80 |
| 5,207,459 A | * | 5/1993 | Glover | 285/23 |
| 5,224,738 A | * | 7/1993 | Taga | 285/14 |
| 5,236,230 A | * | 8/1993 | Mudge et al. | 285/55 |
| 5,306,449 A | | 4/1994 | Brittain | 264/36 |
| 5,320,388 A | | 6/1994 | Lacy et al. | 285/55 |
| 5,466,018 A | * | 11/1995 | Stobbart | 285/334.2 |
| 5,470,111 A | * | 11/1995 | Nelson et al. | 285/55 |
| 5,529,284 A | * | 6/1996 | Berger et al. | 251/149 |
| 5,944,319 A | * | 8/1999 | Kohlman | 277/314 |
| 5,992,467 A | | 11/1999 | Roach | 138/98 |
| 6,042,153 A | * | 3/2000 | DeLange et al. | 285/55 |

(Continued)

*Primary Examiner*—Essama Omgba
(74) *Attorney, Agent, or Firm*—Gene W. Arant (57) ABSTRACT

A method and apparatus for coupling together the ends of two steel pipe sections, each of which contains a permeable inner liner, in which not only are the pipe ends held in abutting engagement, but gas contained within the liner of one pipe section is effectively channeled into the liner of the other pipe section.

14 Claims, 13 Drawing Sheets

U.S. PATENT DOCUMENTS

| | | | |
|---|---|---|---|
| 6,123,317 A | 9/2000 | Densel et al. | 251/148 |
| 6,273,474 B1 * | 8/2001 | DeLange et al. | 285/55 |
| 6,543,120 B1 * | 4/2003 | Aoron, III | 29/451 |
| 6,561,521 B1 * | 5/2003 | Janoff et al. | 277/603 |
| 6,863,313 B1 * | 3/2005 | DeLange et al. | 285/55 |
| 2003/0141719 A1 * | 7/2003 | Ranson et al. | 285/363 |
| 2004/0189006 A1 * | 9/2004 | Jurena | 285/334.2 |
| 2005/0081380 A1 * | 4/2005 | Knoblauch | 29/890.141 |

* cited by examiner

METHOD AND A COUPLER FOR JOINING TWO STEEL PIPES

This application is based on and claims priority from provisional patent application Ser. No. 60/257,415, filed Dec. 21, 2000.

FIELD OF THE INVENTION

A method for joining two steel pipes and a coupler for affecting the same, more specifically a method for joining two steel pipes using a coupler with a milled, tapered inner surface.

BACKGROUND

The present invention is herein described as an apparatus and method used to join pipe, including steel pipe, together which utilizes the structural strength of the adjoining pipes and enables the junction of two steel pipes to be operated safely under high pressure. The effective operation and safety of pipelines is required in the industry. For example, pipelines utilized the world over convey oil, water and gas from source to distributors to consumers. The integrity of these pipelines is of paramount importance to our economy and safety.

This invention relates to the pipeline industry where steel pipe is commonly used. Steel pipe used in the industry is commonly lined with a thermoplastic liner such as polyethylene, nylon and other polyolefins on the interior surface to prevent internal corrosion. In some cases, the liner is used to monitor the integrity of the steel pipe. The segments of steel pipe used in the industry are commonly affixed end to end so as to provide a continuous conduit constructed to facilitate the smooth and even flow of the material transported within the pipeline. The steel pipe is affixed end to end with flanged ends simply bolted together. This manner of joining together steel pipe often results in the weakest point in the pipeline residing at the joint between the pipes and suffers from drawbacks including the joint being over-stressed.

OBJECTS OF THE INVENTION

It is the object of the present to provide a method for joining the removed ends of two sections of flanged or threaded steel pipe in a fluid and/or gas tight joint.

It is another object of the present invention to provide for a device to be incorporated into the junction of two sections of steel pipe to help secure a fluid and gas tight joinder.

SUMMARY OF THE INVENTION

Accordingly, the present invention provides several devices and methods of joining pipe together. One apparatus is a cylindrical coupler which is inserted into the joint area between the removed ends of two adjoining pipes. The coupler has a smooth cylindrical interior and is fitted such that its external bearing facing is flush with the interior milled ends of the cylindrical flanged pipe. Typically, the external facing includes a notch which extends into the space or cutout created by the two adjoining flanged pipes. An embodiment of the apparatus includes at least one flow ring to assist the passage of gas between the liner and the steel casing, through the joint area.

One method for joining pipe involves matching together the two flanged pipe segments to be joined, providing a liner for the interior of each pipe, milling a taper to the internal wall of each pipe end such that each pipe's end mates with the coupler, flaring the liner in the pipe to conform to the machined, tapered internal wall of each pipe, inserting the coupler such that it bridges the divide between the adjoining pipes, providing a pliable ring to be inserted into the area between the flange face of each pipe and fastening the flanges of each pipe to one another. The internal compression within the operating pipeline and the fastening of the flanges combine to wedge the coupler within the pipeline at the joint between two pipes to effectively seal the joint between the two pipe sections.

An alternate preferred method for joining a pair of flanged pipe ends includes using at least one flow ring for placement in the joint area wherein drawing the two flanged portions together will compress the liner between the flow ring and coupler.

An alternate preferred embodiment includes a coupler for use in low pressure connections which couples flared thermoplastic pipe under compression using a collapsing nipple and a coupling adapter.

Applicant also provides a method of flaring thermoplastic pipe sections such that the flared end sections of such pipe may be used with Applicant's couplers, including threaded collapsing nipple and threaded coupling adapter or the flared pipe sections to create an effective sealed joint.

DETAILED DESCRIPTION OF THE PREFERRED EMBODIMENT

Figure 1:
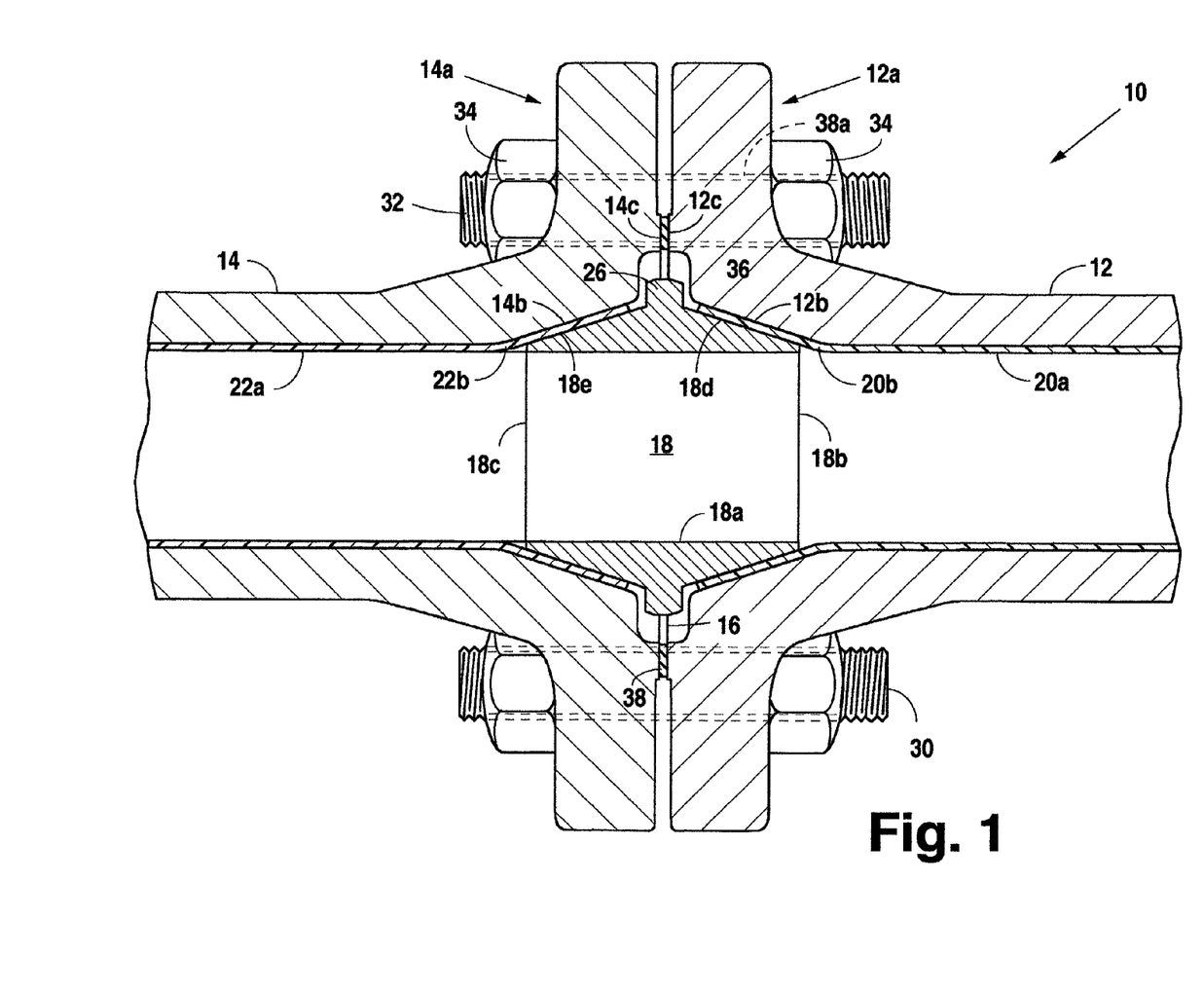
FIG. 1 is a cutaway side elevational view of a cross-section of the device of Applicant's present invention.

The sealing system of the present invention is designed to maintain a fluid tight seal once in place. With reference to FIG. 1, a sealed joint (10) is illustrated wherein a first pipe (12) having a first flanged end (12a) is joined together with a second pipe (14) having a first flanged end (14a). The first flanged end (12a) of the first pipe (12) has a milled internal surface (12b) sufficiently milled to accept the coupler (18) to be inserted into the joint (10). The first flanged end (14a) of the second pipe (14) also has a milled internal surface (14b) sufficiently milled to accept the coupler (18) to be inserted into the joint (10). The surfaces are typically milled to angles of between 5° and 45° as measured from the horizontal as viewed in FIG. 1. Coupler (18) matches the milling angle as set forth in more detail below and as is evident when viewing FIG. 1. The first flanged end (12a) of the first pipe (12) typically abuts the first flanged end (14a) of the second pipe (14). The abutment is achieved by matching up the first flanged end (12a) of the first pipe (12) and the first flanged end (14a) of the second pipe (14). The flange face (12c) of the first pipe (12) forms a seal by abutting, directly or through the use of a copper ring (38), "O" ring or any other pliable, compressible or deformable ring or gasket, the flange face (14c) of the second pipe (14). The internal milled surface (12b) of the first pipe (12) and the internal milled surface (14b) of the second pipe (12) in part may join to form a notch or cutout (16).

A pipe liner (20a) of polyethylene, nylon, or other appropriate composition is inserted into the first pipe (12), cut about even to the end of the pipe and flared (20b) so as to conform with the internal milled surface (12b) of the first pipe (12). A pipe liner (22a) of appropriate composition is likewise inserted into the second pipe (14) and cut about even to the end of the pipe. The pipe liner (22a) of the second pipe is flared (22b) such that it conforms with the internal milled surface (14b) of the flanged end (14a) of the second pipe. A method of flaring the liner ends or plastic pipe is found with reference to FIGS. 5A–5F.

After the pipe liner (22b) has been inserted into the first end of the second pipe (14a) and after the pipe liner (22b) has been flared (22b) to conform to the internal milled surface of the second pipe (22b) and after the pipe liner has been inserted into the first end (12a) of the first pipe (12) and after the pipe liner (20a) has been flared (20a) to conform to the internal milled surface of the first pipe (12b), the coupler (18) is inserted into the joint area created between the abutting first end of the first pipe (12a) and the first end of the second pipe (14a).

The coupler (18) is situated in the joint (10) and acts as a seal to prevent leakage from the junction between the first pipe (12) and the second pipe (14). The coupler has a cylindrical inner wall (18a) typically dimensioned to match the interior diameter of the pipe to facilitate gas or fluid flow within the pipeline, and has a first perimeter (18b) situated in the first pipe (12) and a second perimeter (18c) situated in the second pipe (14). The coupler (18) has a first bearing face (18d) which lays flush with the flanged liner (20a) of the first pipe (12) and a second bearing face (18e) which lays flush with the flanged liner (22b) within the second pipe (14). The coupler is approximately shaped so as to be able to fit within the joint (10). More specifically, the angle of the two bearing faces matches the milling angle of the milled surfaces (12b) and (14b). The first bearing surface (18d) of the coupler (18) and the second bearing surface (18e) of the coupler (18) may culminate in a notch (26) which extends into the cutout (16) created by the flange face of the first pipe (12c) and the flange face of the second pipe (14c). The notch (26) may act as a guide during insertion of the coupler (18) and aids in spacing for installation of the coupler (18). The first bearing surface face (18d) of the coupler (18) and the second bearing face (18e) of the coupler lay flush against the flared liner (20b) of the first pipe (12) and the flared liner (22b) of the second pipe (14). The pressure of the fastener and operation of the pipeline cause first bearing face (18d) and the second bearing face (18e) of the coupler (18) to press against the flanged liner (20b) of the first pipe (12) and the flanged liner (22b) of the second pipe (22b) which in turns causes the flanged liner (20b) of the first pipe (12) and the flanged liner of the second pipe (22b) to more closely contact the milled surface of the first pipe (12) and the milled surface of the second pipe (14b), respectively. The fasteners (30) create compression at the joint and the internal pressure in the first pipe (12) and second pipe (14) help to create a fluid tight seal between the coupler (18) and the joint (10).

In one embodiment of the present invention, a copper ring (38), "O" ring, gasket, sealant, pliable ring or other means, is inserted into the area between the flange face (12c) of the first pipe (12) and the flange face (14c) of the second pipe (14) and seals the circumference of the flange face (12c) of the first pipe (12) and the flange face (14c) of the second pipe (14). A purpose of the ring is to act as a secondary seal to prevent leakage from the joint (10) as, for example, through a gap (36).

After the coupler (18) is inserted into the joint (10) and is appropriately seated, a fastener (30) is secured through the first flanged end (12a) of the first pipe (12) and first flanged end (14a) of the second pipe (14) to tighten the joint (10) to mechanically wedge the coupler (18) so that the bearing surfaces of the coupler are urged against the milled surfaces of the two ends such that the liner is under compression to effect a fluid tight seal to the joint. The fasteners (30) may include a multiplicity of bolts (32) and nuts (34) which are inserted into a preformed receiving space (38a) in the flange of the first pipe (12e) through to a performed receiving space (38b) in the flange of the second pipe (14e). After the bolt (32) is inserted so that it traverses the first flange (12a) and second flange (14a), a nut (34) may then be affixed to the bolt to securely fix the fastener (30) to effectively join the first pipe and the second pipe together to form a fluid seal joint (10).

Figure 2A:
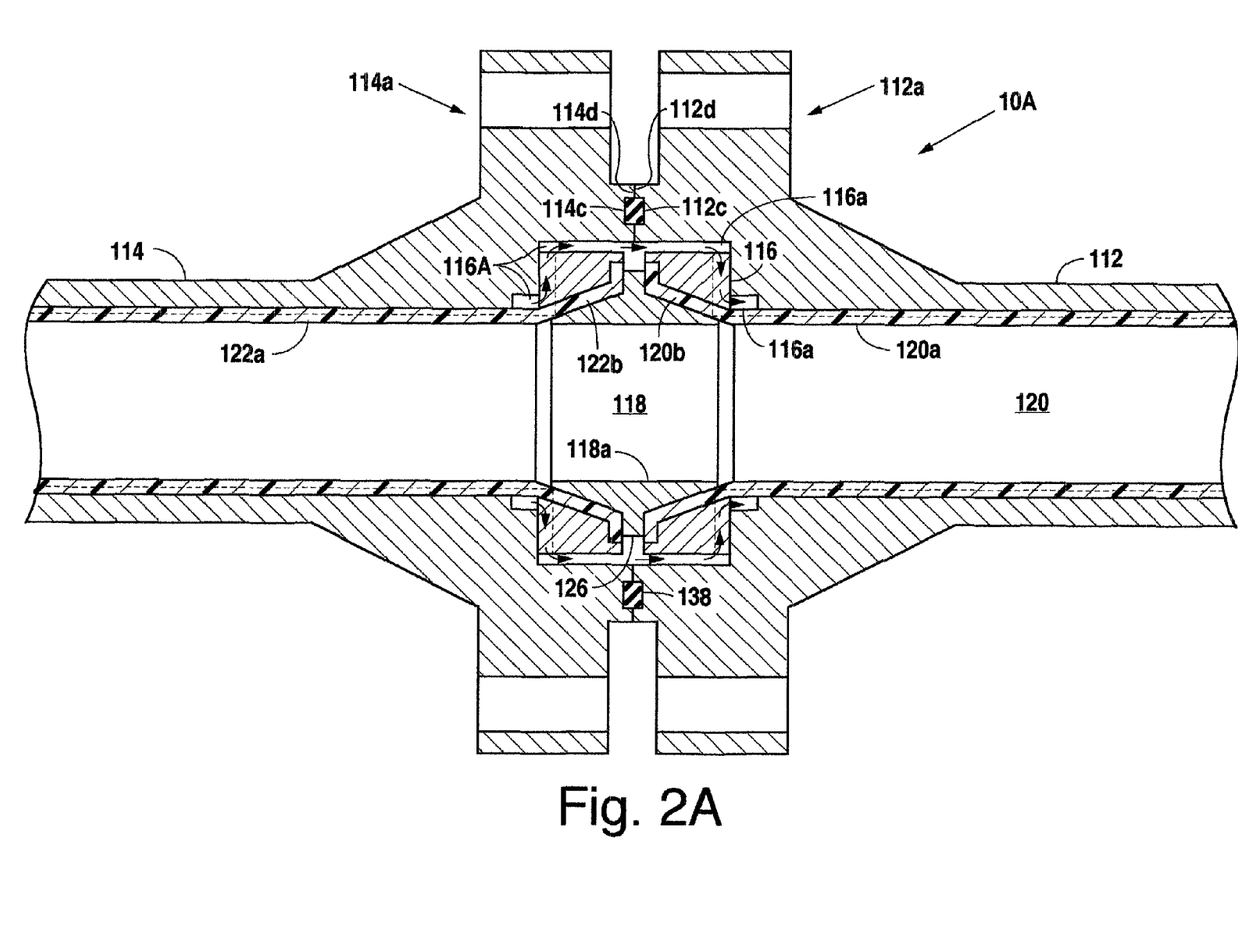
FIG. 2A is a cutaway side elevational view of Applicant's present invention used with grooved liners and flow rings.
Figure 2B:
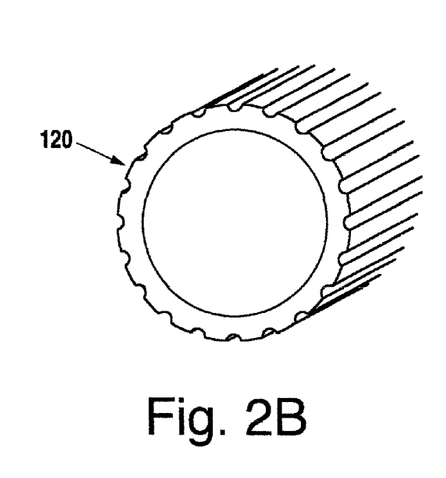
FIG. 2B is a perspective view of a grooved liner.

The pipe liners may be either smooth walled or grooved (see FIG. 2B). The alternate preferred embodiment of Applicant's present invention illustrated in FIGS. 2A through 2E illustrate the method and structure for joining adjacent pipe sections wherein each of the pipe sections has a grooved liner.

A grooved liner (120) having an interior (120a) is illustrated in FIG. 2B. The grooves of the grooved liner lay adjacent the inner cylindrical walls of the sections of steel casing. As gas seeps or permeates through the liner it may flow longitudinally down the pipe section in the grooves of the grooved liner trapped between the liner and the steel walls of the casing. Applicant's novel invention allows such gas to pass through the junction into the grooves of adjacent pipes without escaping the pipes where they are joined at the junction. (See arrows in FIG. 2A showing gas flowing from left to right across the junction of two flanged steel pipes.)

Turning now to FIG. 2A it is seen that Applicant provides an alternate preferred embodiment of a sealed joint (10A) wherein a first pipe (112) having a flanged end (112A) is joined to a second pipe (114) having a flanged end (114A) through the use of fasteners or the like as illustrated in FIG. 1.

Applicant again uses a coupler (118) but, in addition uses a pair of flow rings (140). More specifically, a pair of flow rings is provided to use in conjunction with a coupler such that the flow rings sandwich the tail portions (120B) and (122B) of the grooved liners (120A, first section), (122A, second section). More specifically the tail sections of the adjoining liners are wedged between bearing surfaces (118D and 118E) of the outer surface of coupler (118) and the two rings as set forth in FIG. 2A.

Turning now to FIG. 2A it is seen that Applicant's novel alternate preferred embodiment of a sealed joint (10A) provides for a first pipe (112) placed adjacent a second pipe (114). The first and second pipe each have flanged ends (112A) and (114A), respectively. However, there is no flanged milled surfaces analogous to (12B) and (14B) of FIG. 1. Instead, Applicant provides cutout notch (116) defining a gap (116A) which is capable of receiving a pair of flow rings and coupler (118) in a manner illustrated in FIG. 2A, the function of the flow rings and gap being to allow for gas to pass across the joint to the adjacent liner without leaking. The first pipe and second pipe sections have flanged faces (112C) and (114C) and may optionally have rectangular, semi-circular or other appropriately shaped gasket cutout portions (112D and 114D) for receipt therein of a gasket (138). This gasket acts in the same manner as pliable ring (38) illustrated in FIG. 1 and discussed above, namely to help prevent gas and/or liquid under pressure escaping the joint area.

Figure 2C:
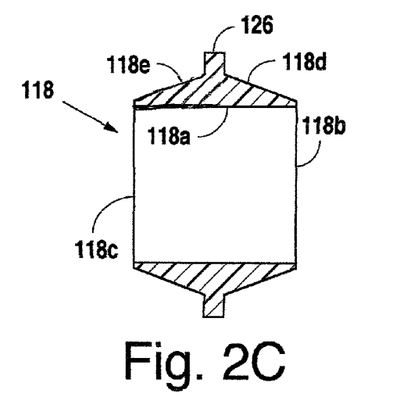
FIG. 2C is a stainless steel coupler in cutaway side elevational view for use with the grooved liner of Applicant's present invention.
Figure 2D:
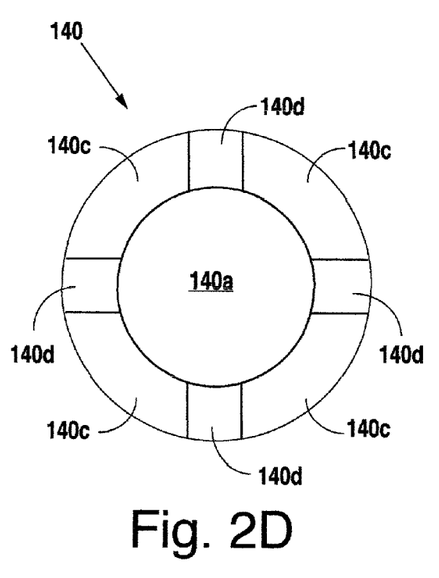
FIGS. 2D and 2E are a front elevational and a side elevational cutaway views, of a flow ring for use with the grooved liner in Applicant's present invention.
Figure 2E:
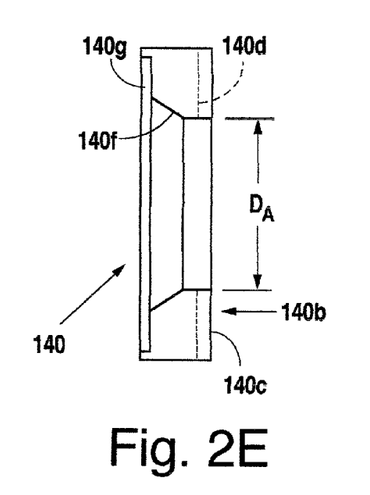

Coupler (118) is illustrated in FIG. 2C. Coupler (118) includes cylindrical inner walls (118A) typically having a radius similar to the internal radius of the pipe. The first perimeter (18B) and second perimeter (18C) are situated in the first pipe and the second pipe second respectively. The first bearing face (18B) and second bearing face (18E) are milled at approximately the same angle of bearing face (140F) of the flow rings (140) (see FIG. 2E). Thus, when the fasteners draw the two pipe sections together, the walls of notch (116) urge against walls defining lands (140C) of each of the two rings forcing the two bearing faces (140F) and bearing faces (118D) and (118E) towards one another and squeezing tail sections (120B) and (122B) to effect a seal. However, gap (116A) in notch (116) would allow the accumulation of gas traveling horizontally between the grooved liner and the inner diameter of the steel casing to accumulate and bays (140D) on the flow rings (140) would allow gas to escape and pass adjacent flow rings of the joint. More specifically, it is seen that flow rings (140) have a perimeter (140B) defining an annulus (140A). The diameter of the annulus at Da (see FIG. 2E) is typically less than the diameter of the steel pipe, but greater than inner diameter of the stainless steel coupler. This allows the tail sections of the liner to be squeezed as the joint is tightened. The perimeter (140B) of the flow rings (140) includes lands (140C) and bays (140D). Lands will be urged up against respective walls of notches (116) and bearing face (140F) is notched (140G) to receive the removed ends of the tail sections of the liner as set forth in FIG. 2A.

Thus, it is seen in Applicant's first alternate preferred embodiment of sealed joint (10A) that it is capable of providing for the passage of the gas between a grooved liner and the inner walls of a section of steel casing to an adjacent area between an adjacent liner and an adjacent inner casing of a steel section, is gas sealed manner.

Figure 3A:
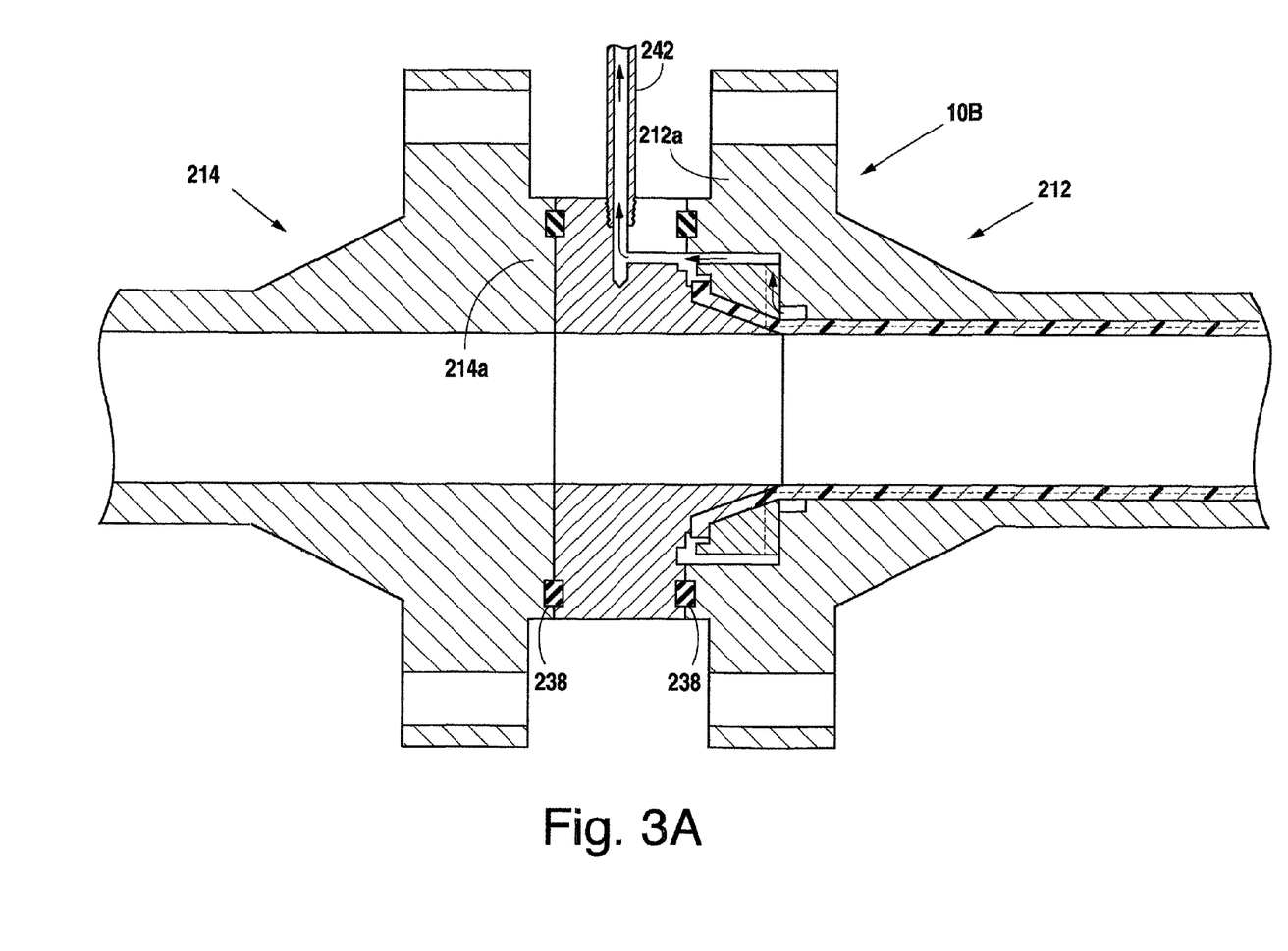
FIG. 3A is a side elevational cutaway view of Applicant's present invention used with a grooved liner within a steel pipe section wherein the pipe section joins an end piece.
Figure 3B:
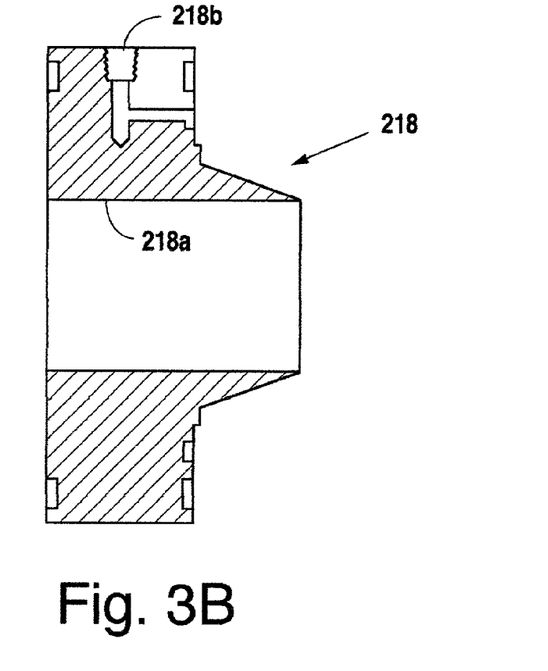
FIG. 3B is a side elevational view, cutaway, of a coupler for use with Applicant's alternate preferred embodiment of the joint illustrated in FIG. 3A.
Figure 3C:
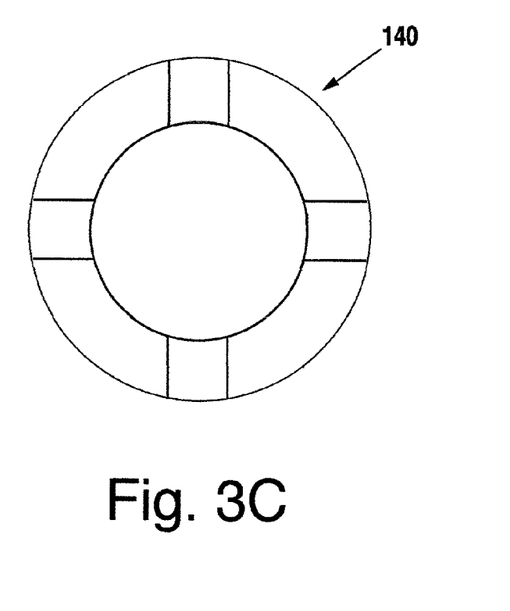
FIGS. 3C and 3D are a front elevational and a side elevational, cutaway views of a flow ring for use with the alternate preferred embodiment of Applicant's present invention illustrated in FIG. 3.
Figure 3D:
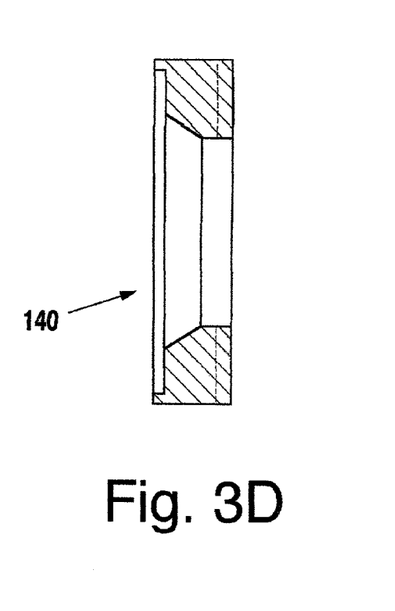

Applicant provides a second alternate preferred embodiment, illustrated in FIGS. 3A–3D. This alternate preferred embodiment is used when a steel pipe section (212) joins an unlined end piece (214). The first pipe section (212) is similar to the two pipe sections that joined one another in the alternate preferred embodiment illustrated with respect to FIGS. 2A to 2E. However, end piece (214) represents the end of the lined pipe. It is readily apparent in observing FIG. 3A that there is no lining to end piece (214). However, an effective seal for gas being carried within the first pipe (212) is still usually necessary. At the same time, it is often preferable to vent permeated gas—that is, gas that is trapped between the outer surface of the grooved liner and the inner surface of the steel pipe. Applicant's invention provides for such an effective seal. More specifically, Applicant provides a novel coupler (218) with walls defining a cylindrical inner diameter (218A) which is typically approximately equal to the inner diameter of the lined first pipe (212). A single flow ring is used (140) constructed as per the specifications set forth in FIGS. 2C and 2D above. The tail of the grooved liner is wedged between coupler (218) and flow ring (140) allowing, however, permeated gas to escape through bays and out vent pipe (242). It is noted that vent pipe (242) is threadibly or otherwise attached to channel (218B) in coupler (218). The path the permeated gas may travel is illustrated in FIG. 3A. The coupler (218) will have at least one channel (218B) and vent pipe (242). Gaskets (238) may be provided between sidewalls of coupler (218) and the inner face of flanged end (212A) of the first pipe (212). Gaskets may also be provided between the walls (214A) of coupler (218) and the end piece (214).

Figure 5A:
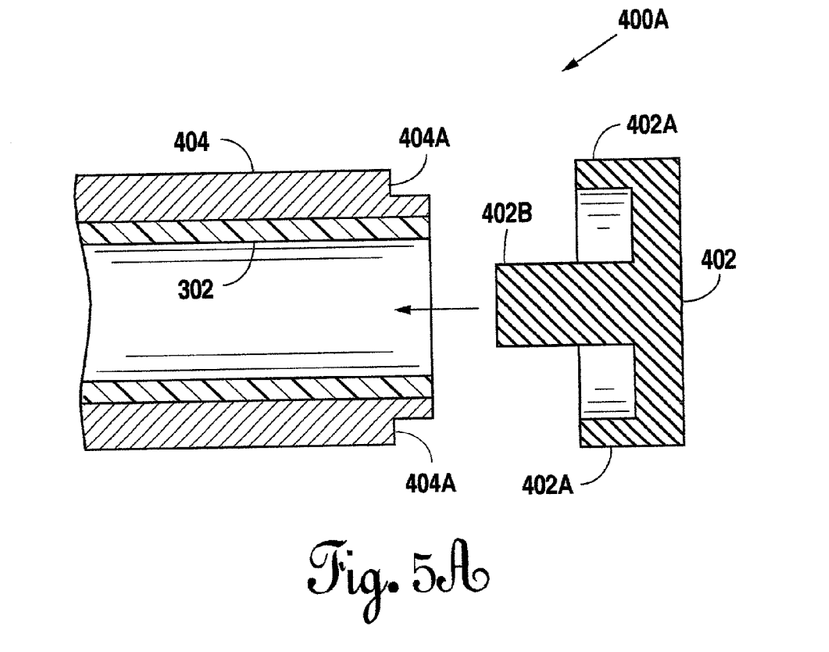
FIGS. 5A, 5B, 5C, 5D, 5E and 5F all illustrate steps and apparatus used to flare ends of thermoplastic pipe or pipe liner.
Figure 6A:
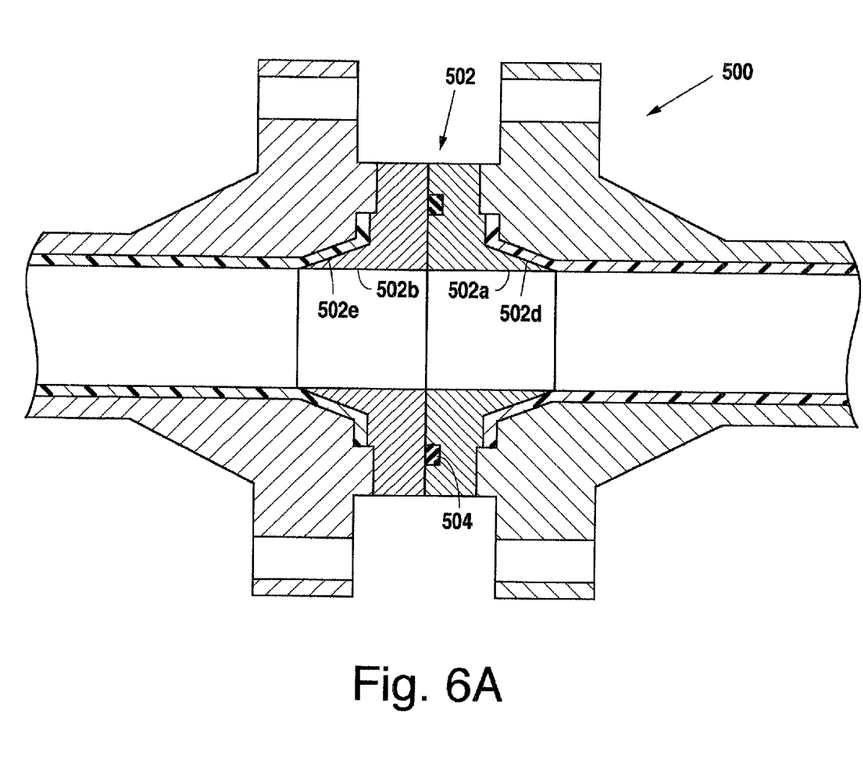
FIGS. 6A and 6B illustrate cross sectional elevational views of novel split coupler for compressibly joining lined steel tubing, which novel split coupler allows for lateral separation of the tube pipe sections following removal of the fasteners.
Figure 6B:
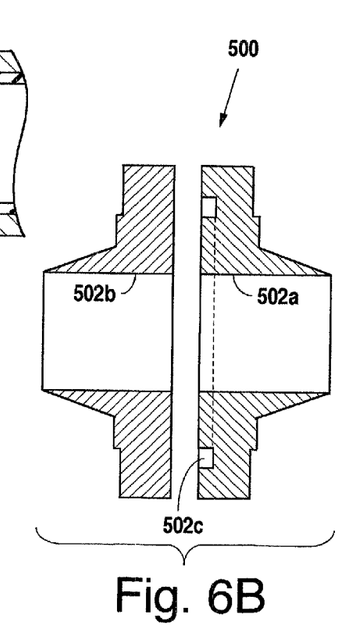

FIGS. 6A and 6B illustrate a fluid and gas tight joint (500) which uses a split coupler (502) for compressively joining steel tubing having a flared liner. More specifically, it is seen that coupler (502) includes a first section (502A) and a second section (502B), the two sections for joining along a common face as illustrated in FIG. 5A. One or both of the sections may include a cutout portion (502C) for placement of a gasket (504) therein. The gasket will prevent leakage through the joint where the two split sections meet. Bearing surfaces (502D and 502E) will squeeze the flared liner as the two steel flanges are brought together through the use of fasteners.

The split coupler (502) is beneficial for use in a situation where lateral separation of one pipe section with respect to the other is required, as for example when one pipe liner must be removed for inspection. In the earlier embodiments of the coupler, sliding one section laterally with respect to the other would not be possible unless the two pipe sections were first separated along the longitudinal axis of the pipe. This is sometimes difficult to do and thus the split coupler may be used where pipe liner removal is desired, since it allows sliding one pipe section laterally with respect to the other so, for example, one or both of the liners may be removed.

Figure 4A:
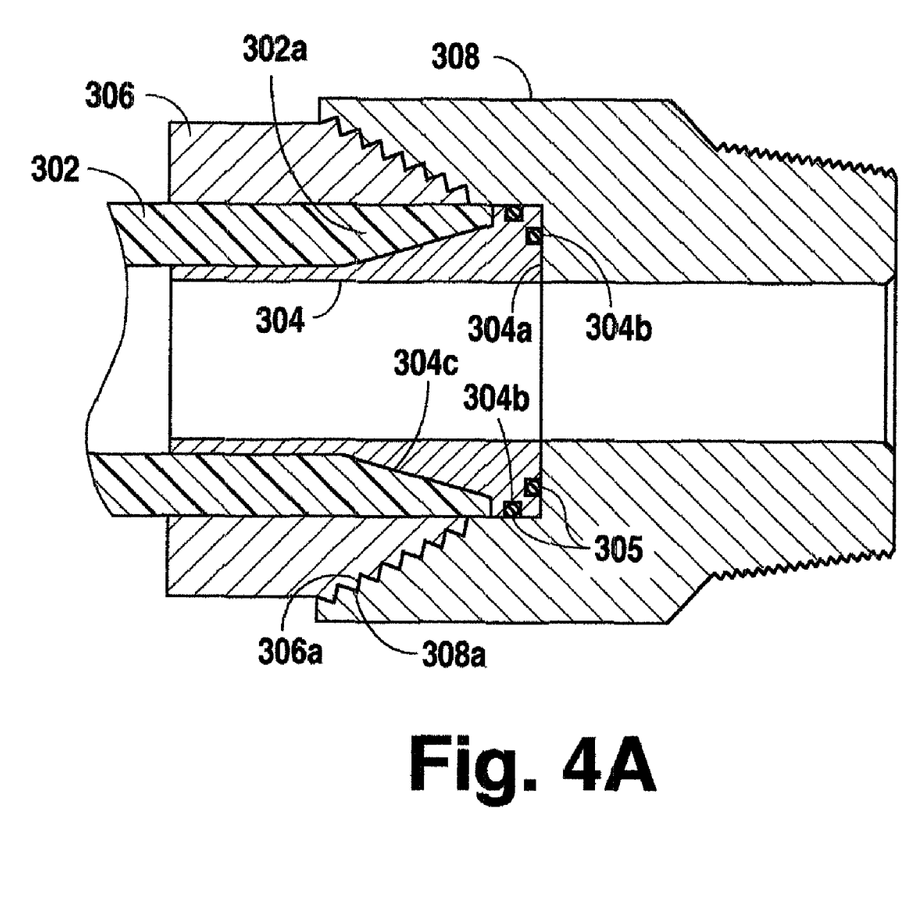
FIG. 4A is a side elevational view, cutaway, of a low pressure connection for connecting one section of thermoplastic pipe to a second section of thermoplastic pipe.
Figure 4B:
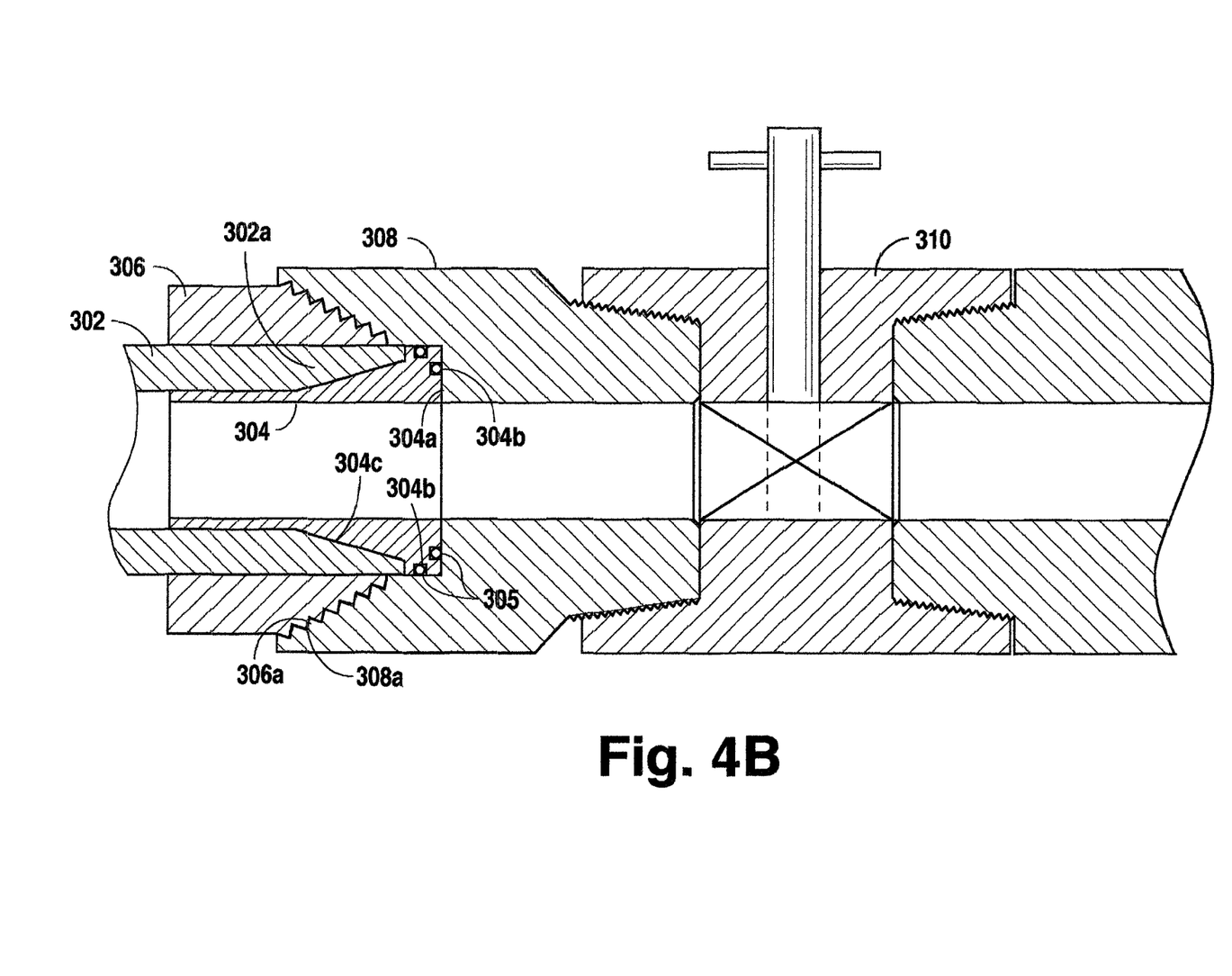
FIG. 4B is a side cutaway view of a low pressure connection illustrating the joinder of low pressure pipe, typically thermoplastic, to a cutoff valve, the joint illustrated with the use of Applicant's novel low pressure coupler.

FIGS. 4A and 4B illustrate Applicant' novel low pressure connection. More specifically, low pressure connection provides a sealed joint (300) wherein a thermoplastic pipe (302) is connected in gas and fluid type manner to a couple adapter (308). Applicant's method of providing a sealed joint (300) includes the use of pipe (302) having, at a removed end thereof, a flared portion (302A). The flared portion may be formed through the use of the instruments and steps set forth with respect to FIGS. 5A through 5F below. A novel coupler (304) is provided for insertion into the removed flared end of the thermoplastic liner or pipe as set forth in FIGS. 4A and 4B. More specifically, it is seen that coupler (304) includes a coupler end wall for abutting the coupling adapter, which end wall may include notch or notches (304B) in which one or more "O" rings (305) may seat to seal between the end wall of the coupler and the walls of coupling adapter (308).

It is seen that coupler (304) has an inner diameter slightly smaller than the inner diameter of the pipe or liner and includes a bearing face (304C) which, when collapsing nipple (306) is threaded into coupler adapter (308), will be urged against flared portion (302A) of the thermoplastic pipe. This illustrates yet another device for squeezing, under compression, a heated thermoplastic liner or pipe (302) between a coupler (here coupler (304)), and other structure of the joint. Here the compressive force is being asserted by a combination of collapsing nipple (306) having threads (306A) mating with threads (308A) of coupling adapter (308) such that when the collapsing nipple is threaded into the coupling adapter, compression is asserted on the end of the thermoplastic pipe forcing flared portion (302A) against bearing face (304C) while wedging in to the coupler against the coupling adapter.

FIG. 4B illustrates a manner in which a thermoplastic or other pipe section is joined to another structure, here cutoff valve (310). Applicant's novel combination of flared liner, coupler collapsing nipple and coupling adapter set forth in FIG. 4A, may be used to mate or join, in fluid tight connection, the plastic liner to any other structure, herein FIG. 4B, illustrating a prior art cut off valve. Thus, coupling adapter (308) may include threads (308A) that are dimensioned for receipt into a standard fitting such as cutoff valve (310) or other suitable device.

Figure 4C:
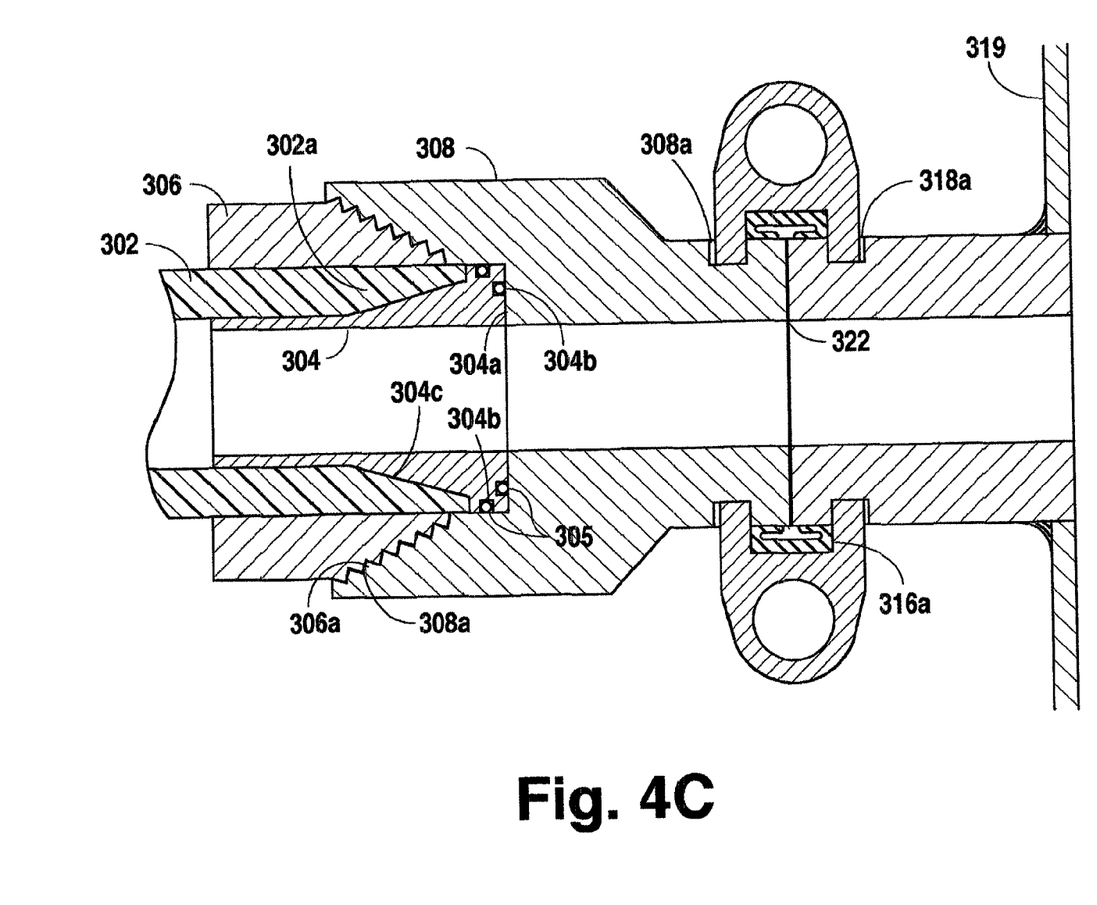
FIGS. 4C, 4D and 4E illustrate various views of Applicant's invention for use with a low pressure joint, the invention involving a novel coupler, collapsing nipple and coupling adaptor, adapted for use with a vitriolic clamp.
Figure 4D:
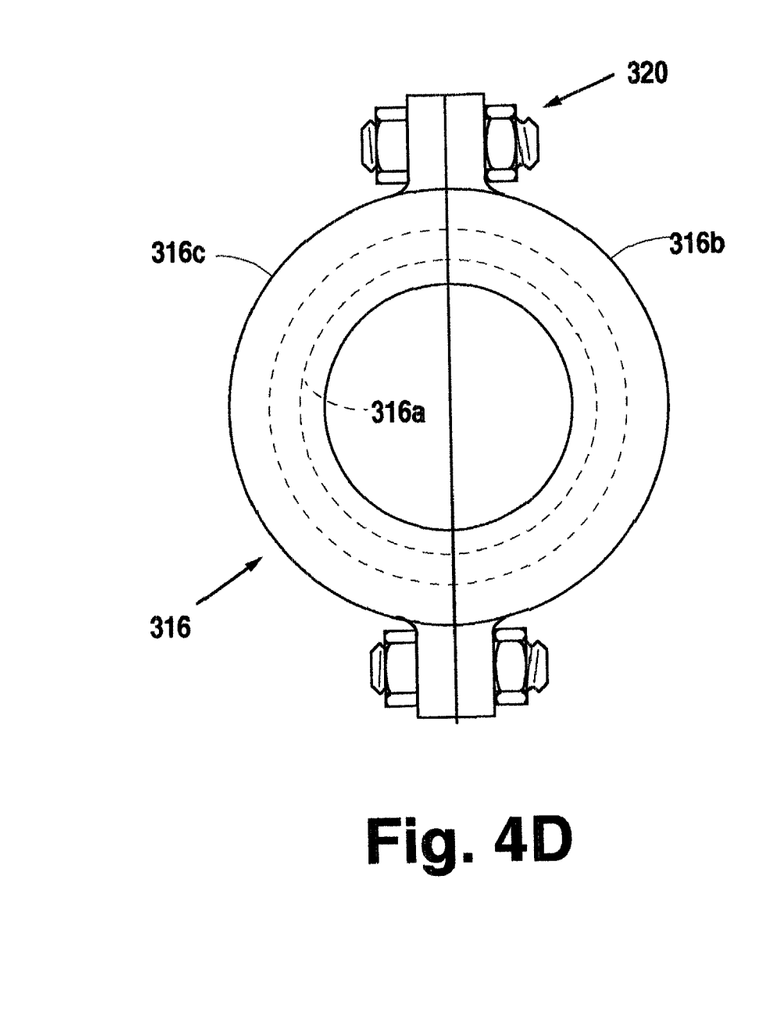
Figure 4E:
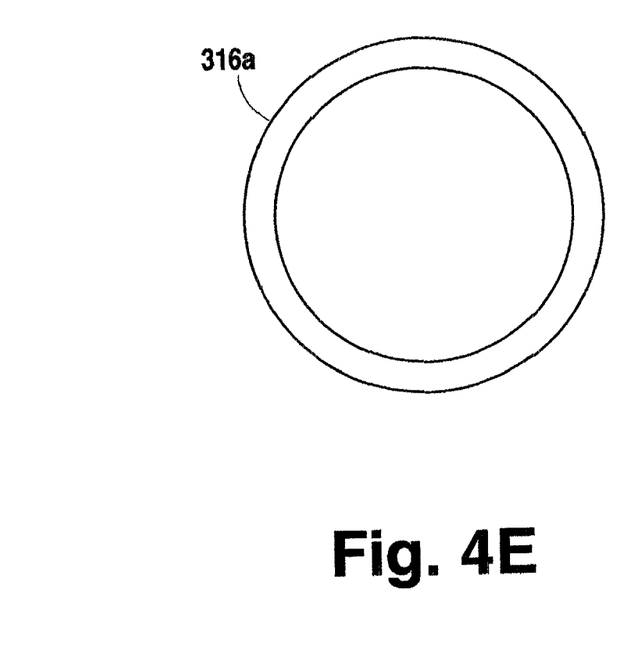

FIGS. 4C, 4D and 4E illustrate the use of Applicant's low pressure joint (300), including novel coupler (304), collapsing nipple (306) and coupling adapter (308), adapted for use with a vitriolic clamp (316) to attach coupling adapter (308) to a vitriolic end (318) which may be attached to a storage tank (319). It is seen that vitriolic clamp (316) includes two semi-circular sections (316B and 316C) which are designed to contain vitriolic gasket (316A) therein so that it collapses against joint (322) created between vitriolic end (318) and coupling adapter (308). A pair of fasteners (320), such as a nut and bolt combination, will collapse vitriolic gasket, typically rubber, adjacent the outer parameter of joint (322) as seen in FIG. 4C. It is seen that vitriolic end (318) has an annular groove (318A) therein as does coupling adapter (308), annular groove seen here at (308A).

The embodiment illustrated in FIGS. 4A, 4B and 4C illustrates a device for accomplishing a fluid and gas tight seal that would, typically, be used in a low pressure environment. A low pressure environment would typically include a maximum pressure in the liner of about 200 pounds per square inch. The liner may be polyethylene plastic or the suitable material.

The embodiments illustrated in FIGS. 1, 2A and 3A are typically suitable to a high pressure environment wherein a combination of a gas and/or fluid under high pressure is carried within the liner. These pressures may be up to 2,000 pounds per square inch.

FIGS. 5A through 5E illustrate a method of flaring the liner (302) for the coupling described above. More specifically, FIG. 5A illustrates step 400A wherein a heated iron (402) is provided and located adjacent to a holding die (404). The heated iron is dimensioned to include arms (402A) and nose (402B). Holding die (404) is dimensioned to include notch (404A) at the removed end thereof. Holding die (404) is cylindrical for a snug receipt therein of liner (302) as illustrated in FIG. 5A. Nose (402B) is dimensioned to be cylindrical with the diameter less than the diameter of liner (302).

Figure 5B:
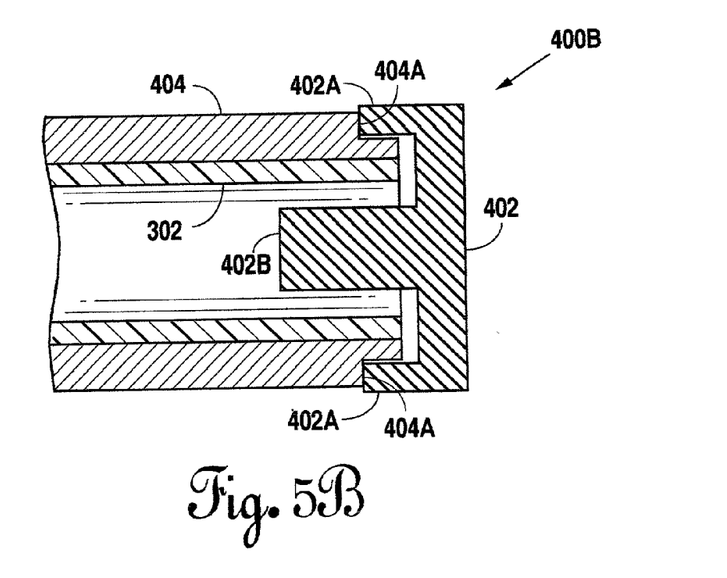

FIG. 5B illustrates heating step (400B). In this step, it is to be noticed that arms (402A) engage snugly notch (404A) of the holding die in such a manner that nose (402B) does not contact liner (302), yet is sufficiently close to the liner that it may heat the liner. Heating occurs during heating step (400B) by use of heated iron (402) being received within holding die (404).

Figure 5C:
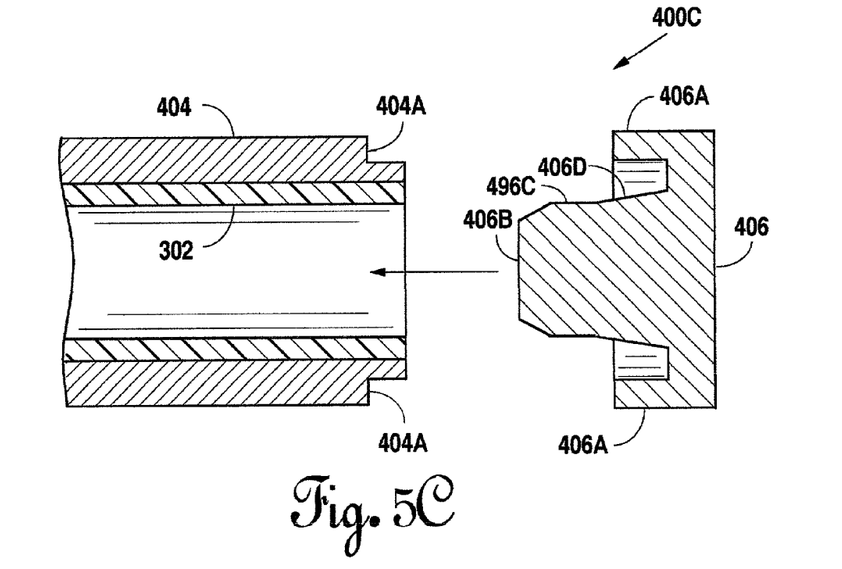

FIG. 5C illustrates a providing step (400C) wherein a flaring die (406) is provided and located adjacent holding die (404), which has just been heated as described in step (400B) above. Note the design of flaring die (406). It is provided with arms (406A) designed to engage notches (404A) of the holding die. It also has a cylindrical protruding portion which 22 includes a nose (406B) which is dimensioned to be received within the cylindrical liner in a non-interfering manner. The protruding portion also includes a flat portion (406C) with a diameter approximately to that of liner (302). The protruding portion of the flaring die also includes a flared portion (406D) which is cylindrical and increases in diameter to a maximum diameter that is less than the outside diameter of the cylindrical liner, but greater than the inside diameter of the cylindrical liner.

Figure 5D:
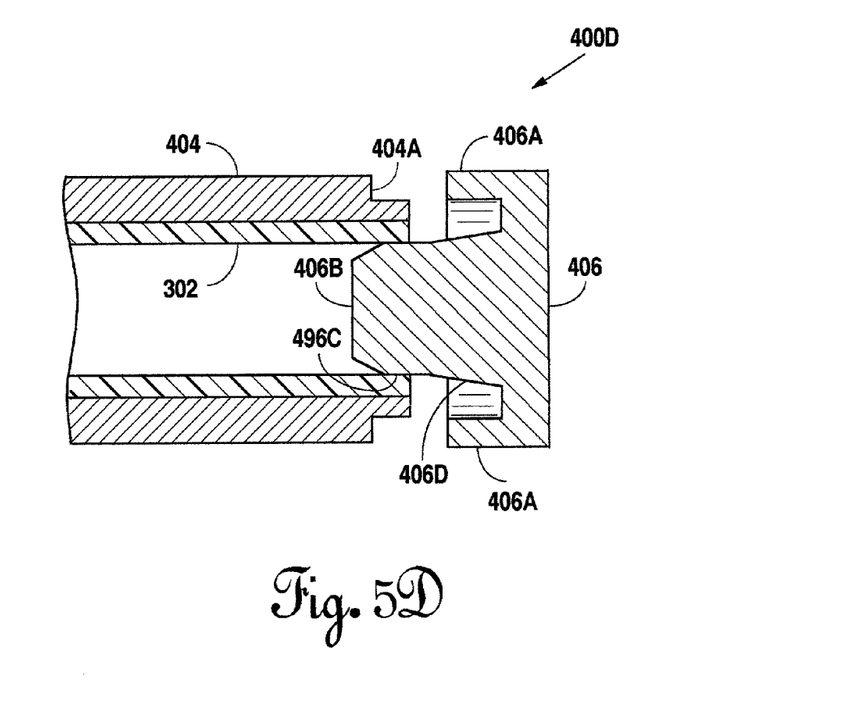

FIG. 5D illustrates the initial step of the flaring process (400D) with the insertion of the flaring die (406) into a still warm thermoplastic liner (302).

Figure 5E:
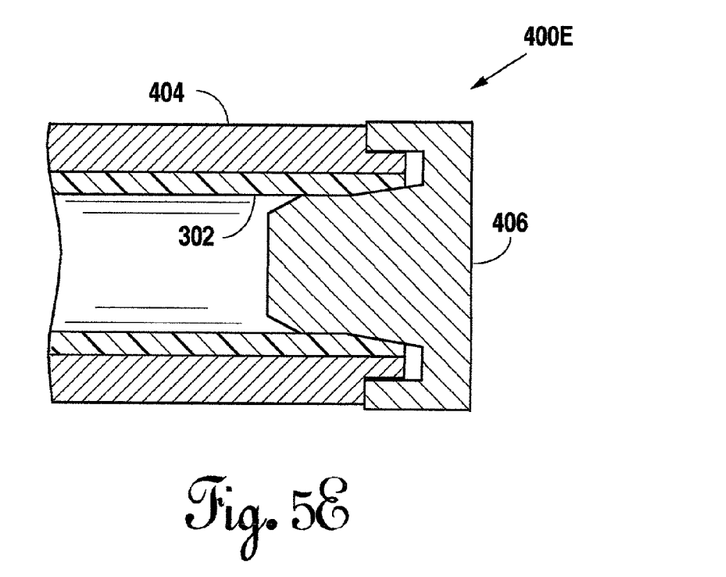

FIG. 5E illustrates the next step of the flaring process (400E) wherein the uniform flaring die (406) firmly seated in the holding die (404), forcing the liner into the flared shape.

Figure 5F:
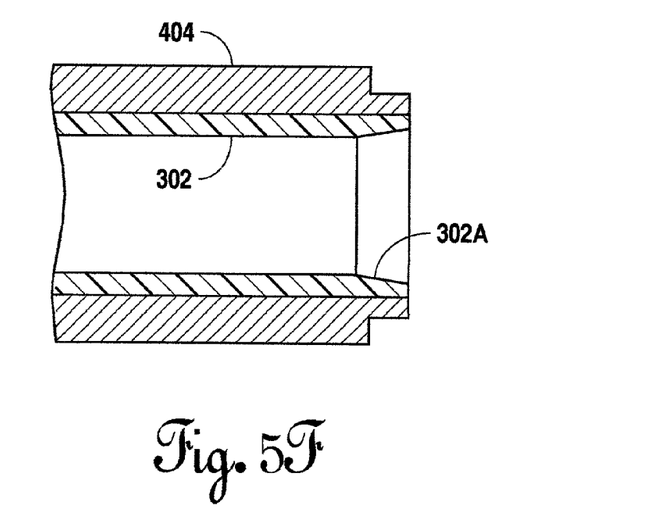

FIG. 5F illustrates the removal step (400F) and the holding die (404) following removal of flaring die (406) and, more specifically illustrates that liner (302) now includes a flared portion (302A).

Although the invention has been described with reference to specific embodiments, this description is not meant to be construed in a limited sense. Various modifications of the disclosed embodiments, as well as alternative embodiments of the inventions will become apparent to persons skilled in the art upon the reference to the description of the invention. It is, therefore, contemplated that the appended claims will cover such modifications that fall within the scope of the invention.

I claim:

1. In a pipeline having a plurality of longitudinal pipe sections, a joint mechanism coupling two such sections, comprising:

pipe sections having outwardly flanged end portions;

means holding outer end surfaces of the pipe sections in abutting and sealing relationship, the flanged end portions then also providing an annular space to receive a coupling ring;

a coupling ring disposed within the annular space and having an inner diameter conforming to an inner diameter of the pipe sections, the coupling ring also having longitudinally tapered outer end surface portions;

each pipe section also containing a cylindrical lining member covering an inner wall surface of the pipe section;

end portions of respective liners extending into the annular space in contact with respective tapered outer surfaces of the coupling ring, the liner ends not being in physical contact with each other; and the annular space permitting fluid or gas that may be moving within the liner of one pipe section to flow around an outer circumference of the coupling ring and into the liner of the other pipe section when the pipe sections are coupled in abutting and sealing relationship.

2. A joint mechanism as in claim 1 wherein each lining member has longitudinal grooves on its outer wall surface to permit fluid or gas that may seep through the liner to move within the grooves longitudinally of an associated pipe section.

3. A joint mechanism as in claim 2 wherein the holding means also clamps the coupling ring in tight engagement with outer end portions of the liners.

4. A joint mechanism as in claim 2 which further includes a pair of flow rings encasing the end portions of respective liners, the flow rings having mutually aligned openings to permit fluid or gas moving within the liner of one pipe section to flow around the outer circumference of the coupling ring and into the liner of the other pipe section.

5. A joint mechanism as in claim 1 wherein the holding means also clamps the coupling ring in tight engagement with outer end portions of the liners.

6. A joint mechanism as in claim 5 wherein each lining member has longitudinal grooves on its outer wall surface to permit fluid or gas that may seep through the liner to move within the grooves longitudinally of an associated pipe section.

7. A joint mechanism as in claim 1 which further includes a pair of flow rings encasing the end portions of respective liners, the flow rings having mutually aligned openings to permit fluid or gas moving within the liner of one pipe section to flow around the outer circumference of the coupling ring and into the liner of the other pipe section.

8. In a pipeline having a plurality of longitudinal pipe sections, a joint mechanism coupling two such sections, comprising:
   each pipe section containing a lining member that covers an inner wall surface of the pipe section, both the pipe sections and their associated liners having outwardly flanged end portions;
   the flanged end portions of the pipe sections and liners also providing an annular space to receive a coupling ring;
   a coupling ring disposed within the annular space, and having longitudinally tapered outer end surface portions that supportingly engage flared end portions of the liners, the liner ends not being in physical contact with each other;
   means holding outer end surfaces of the pipe sections in abutting and sealing relationship; and
   the annular space permitting fluid or gas that may be moving within the liner of one pipe section to flow around the outer circumference of the coupling ring and into an liner of the other pipe section when the pipe sections are coupled in abutting and sealing relationship.

9. A joint mechanism as in claim 8 wherein each lining member has longitudinal grooves on its outer wall surface to permit fluid or gas that may seep through the liner to move within the grooves longitudinally of an associated pipe section.

10. A joint mechanism as in claim 9 which further includes a pair of flow rings encasing end portions of respective liners, the flow rings having mutually aligned openings to permit fluid or gas moving within the liner of one pipe section to flow around the outer circumference of the coupling ring and into the liner of the other pipe section.

11. A joint mechanism as in claim 10 wherein the holding means also clamps the flow rings in tight engagement with the outer end surfaces of liners, and the coupling ring in tight engagement with their inner end surfaces.

12. A joint mechanism as in claim 8 which further includes a pair of flow rings encasing the end portions of respective liners, the flow rings having mutually aligned openings to permit fluid or gas moving within the liner of one pipe section to flow around the outer circumference of the coupling ring and into the liner of the other pipe section.

13. A method of joining and securely sealing together ends of two steel pipe sections that contain gas-permeable interior liners, comprising the steps of:
   forming the end portions of both the pipe sections and their associated liners into an outwardly flared configuration so as to provide an annular space for receiving a coupling ring between joined ends of two such pipe sections;
   selecting a coupling ring having an interior circumferential surface conforming to an interior space of the pipe sections, having longitudinally sloped outer end surfaces to receive the flared end portions of the liners, and having a radially protruding circumferential shoulder intermediate its two ends;
   placing the coupling ring within the annular space so that its radially protruding circumferential shoulder provides longitudinal separation between the ends of the liners while its sloped end surfaces engage and receive the flared end portions of the liners; and
   leaving coupling the pipe sections in abutting and sealing relationship, a radial space about the coupling ring to allow fluid or gas flowing longitudinally within the liner of one of the pipe sections to flow about the circumferential shoulder of the coupling ring and hence into the liner of the other pipe section.

14. A method of claim 13 wherein a pair of flow rings are utilized to encase the end portions of respective liners, which have mutually aligned openings to permit the flow of fluid or gas.

\* \* \* \* \*